(12) United States Patent
Albers

(10) Patent No.: US 9,155,410 B2
(45) Date of Patent: Oct. 13, 2015

(54) NESTING AND RECONFIGURABLE WINE GLASS

(71) Applicant: Luft Industrie Inc., Oakland, CA (US)

(72) Inventor: Oliver Albers, Oakland, CA (US)

(73) Assignee: Luft Industrie Inc., Oakland, CA (US)

( * ) Notice: Subject to any disclaimer, the term of this patent is extended or adjusted under 35 U.S.C. 154(b) by 0 days.

(21) Appl. No.: 14/293,657

(22) Filed: Jun. 2, 2014

(65) Prior Publication Data

US 2014/0353309 A1  Dec. 4, 2014

Related U.S. Application Data

(60) Provisional application No. 61/829,362, filed on May 31, 2013.

(51) Int. Cl.
*A47G 19/22* (2006.01)
*A47G 19/23* (2006.01)
*B65D 8/00* (2006.01)

(52) U.S. Cl.
CPC ............ *A47G 19/2205* (2013.01); *A47G 19/23* (2013.01); *B65D 11/02* (2013.01); *A47G 2019/2277* (2013.01); *Y02W 90/13* (2015.05); *Y02W 90/14* (2015.05)

(58) Field of Classification Search
CPC ... A47G 19/2205; A47G 19/23; A47G 19/22; A47G 2019/2277; B65D 11/18; B65D 11/1866; B65D 11/02; Y02W 90/13; Y02W 90/14

USPC ............ 220/4.07, 4.06, 4.04, 4.21, 711, 703; 206/517, 515, 546, 541, 223, 217; 222/570, 567, 566

See application file for complete search history.

(56) References Cited

U.S. PATENT DOCUMENTS

| | | | |
|---|---|---|---|
| 640,860 A * | 1/1900 | Baum, Jr. ..................... 215/377 |
| 1,020,617 A | 3/1912 | Matthews |
| 1,033,744 A | 7/1912 | Smith |
| 1,125,171 A | 1/1915 | Provandie |
| 1,133,050 A | 3/1915 | Mearkle |
| 1,255,133 A | 2/1918 | Carr |
| 1,351,412 A | 8/1920 | Carr |
| 1,514,034 A | 11/1924 | Carr |
| 1,690,586 A | 11/1928 | Main |
| 1,725,265 A * | 8/1929 | Glendinning ................. 206/546 |
| 1,738,782 A | 12/1929 | Main |
| 2,323,287 A | 8/1939 | Amberg |
| 2,236,060 A | 3/1941 | Hyndman |
| 3,215,300 A * | 11/1965 | Lynch ......................... 220/4.21 |
| 3,289,822 A * | 12/1966 | Schumer et al. ................. 206/8 |

(Continued)

*Primary Examiner* — Robert J Hicks
(74) *Attorney, Agent, or Firm* — Onello & Mello, LLP

(57) ABSTRACT

Provided is a wine glass comprising a separate top portion and a bottom portion that can be joined together to form a single wine glass. The top portion has a drinking rim opposite a lower rim and the top portion has an enclosed bottom opposite and upper rim. The lower rim of the top portion and the upper rim of the bottom portion join together to form a leak-proof drinking vessel or cup of the wine glass. When separated, the top portion and bottom portion can be nested together. Additionally, a plurality of such wine glasses can be nested together, so that a large number of wine glasses can be packaged together for economical storage and shipping. The wine glass can be disposable and biodegradable or compostable, as examples.

17 Claims, 12 Drawing Sheets

(56) References Cited

U.S. PATENT DOCUMENTS

| | | | | |
|---|---|---|---|---|
| 3,405,862 A | * | 10/1968 | Spyra | 229/5.6 |
| 5,071,042 A | * | 12/1991 | Esposito | 222/570 |
| 6,409,038 B1 | * | 6/2002 | Karp | 220/212 |
| 2010/0308042 A1 | * | 12/2010 | Faris | 220/8 |
| 2012/0091131 A1 | * | 4/2012 | Arjomand | 220/4.01 |

* cited by examiner

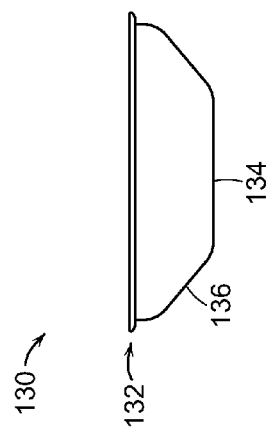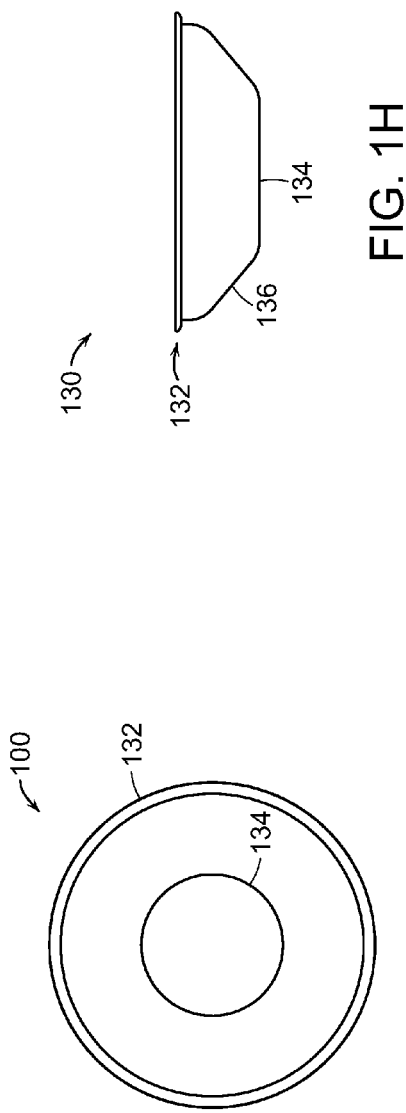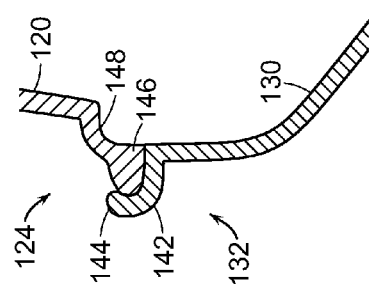

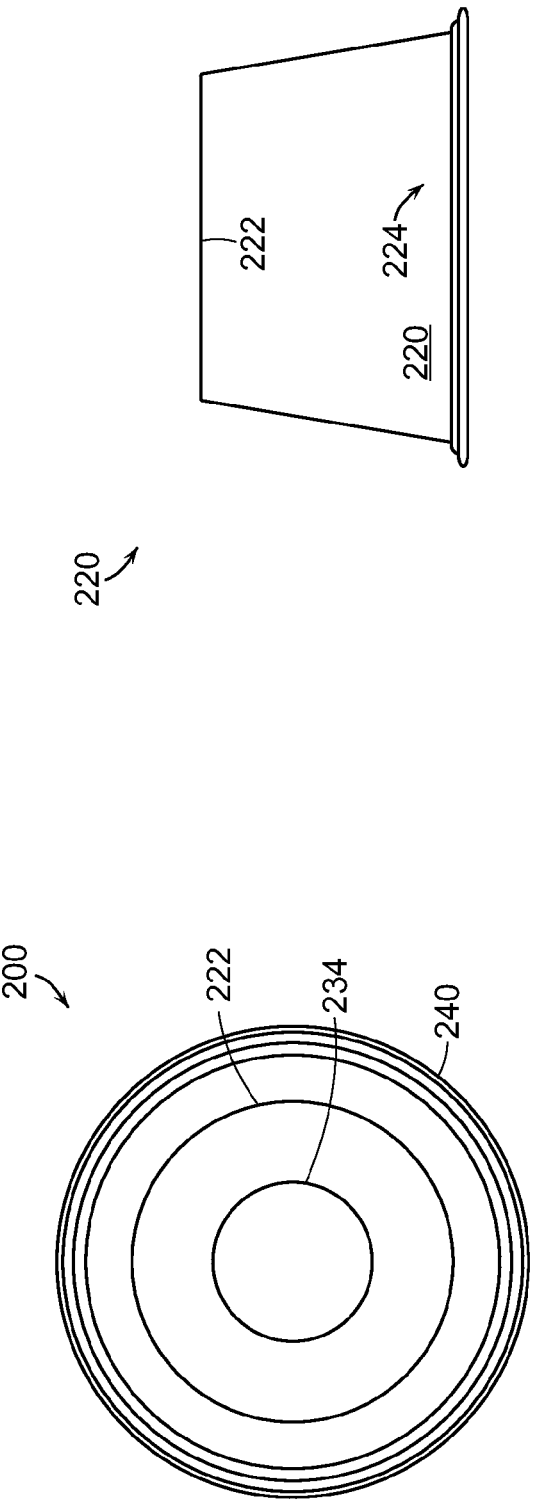

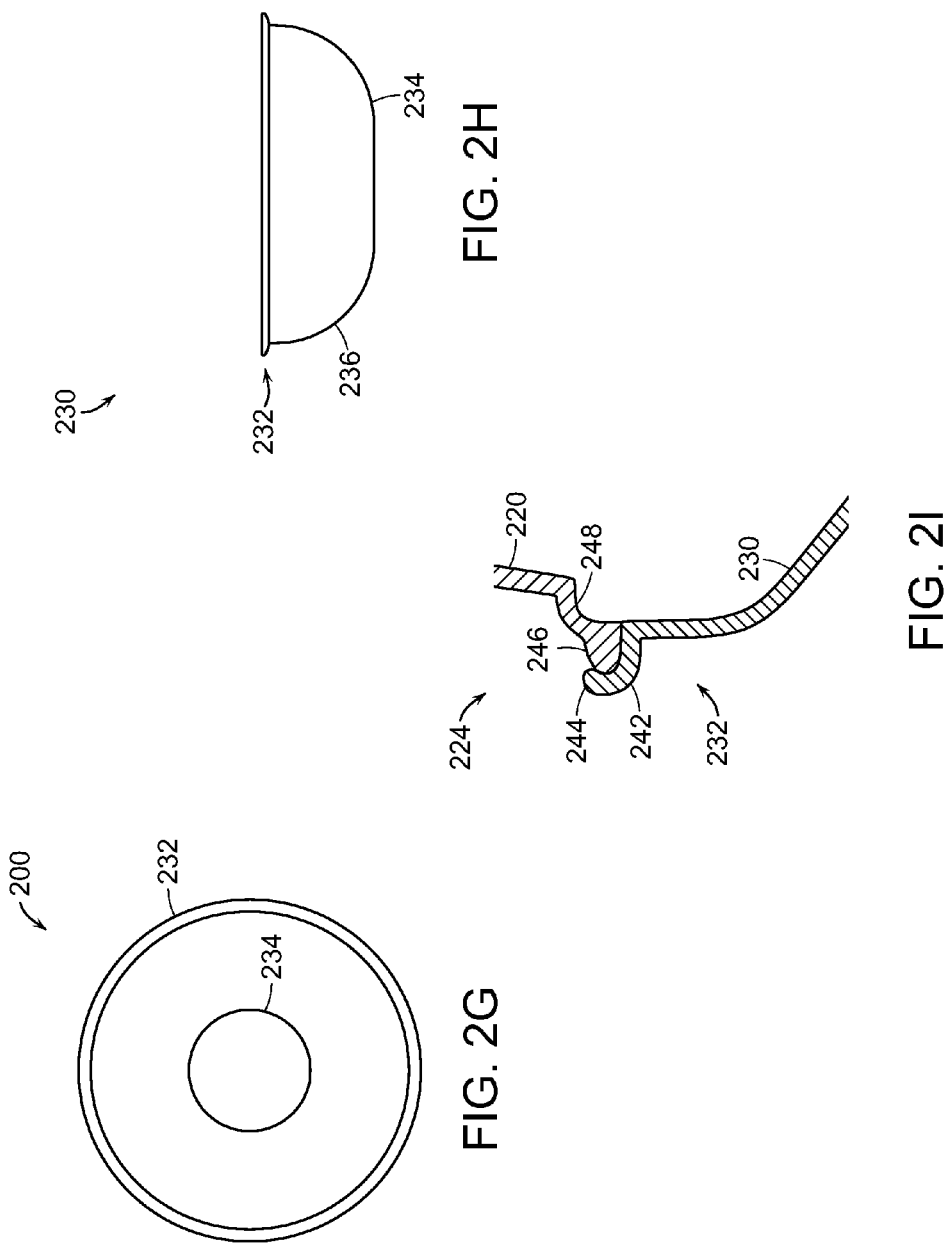

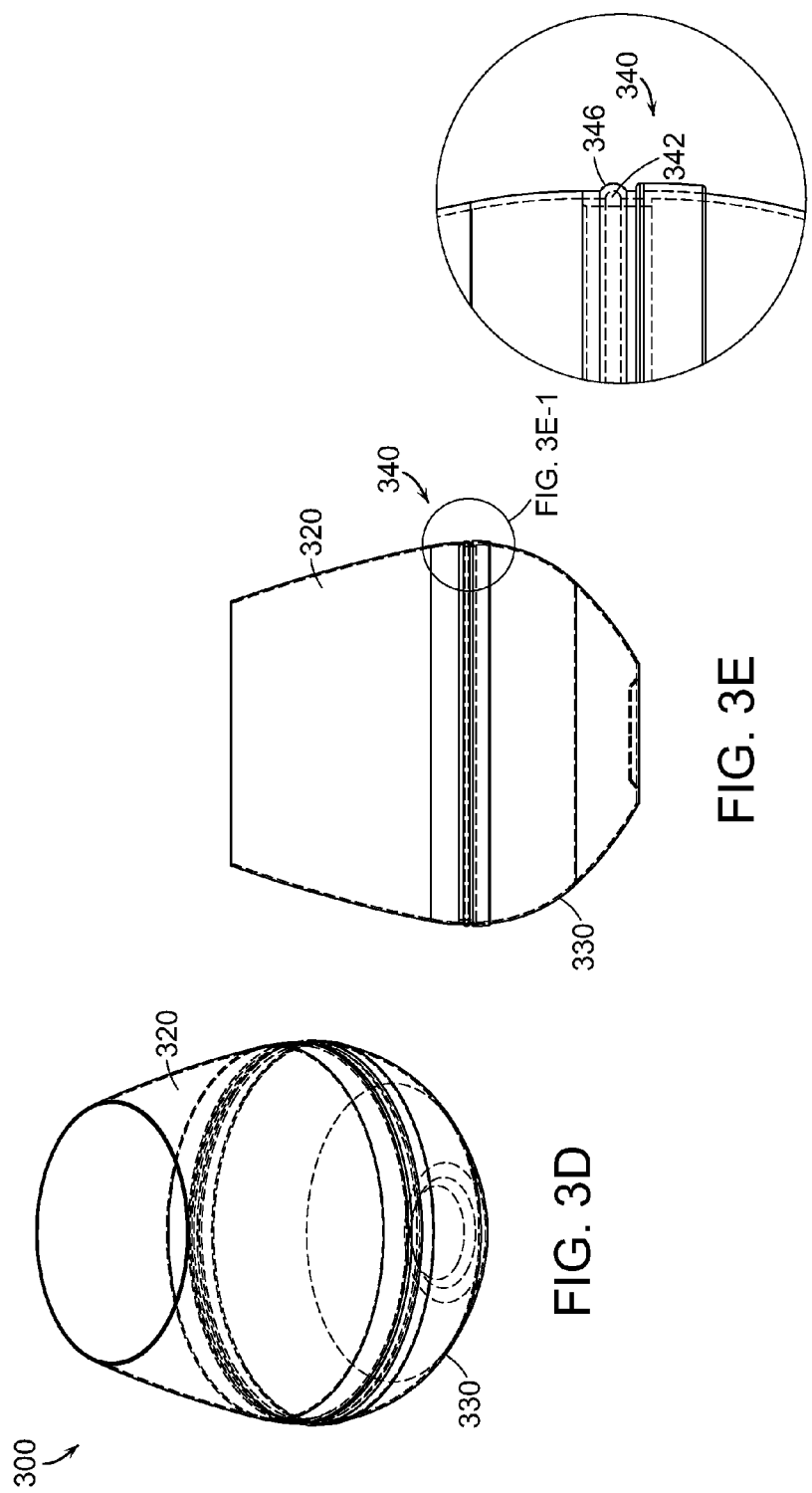

NESTING AND RECONFIGURABLE WINE GLASS

CROSS REFERENCE TO RELATED APPLICATIONS

The present application claims priority under 35 USC 119 (e) to U.S. Provisional Patent Application No. 61/829,362, entitled NESTING AND RECONFIGURABLE WINE GLASS, filed May 31, 2013, the contents of which are incorporated herein by its entirety.

FIELD OF INTEREST

The present inventive concepts relate to the field of beverage containers, and more particularly to the field of wine glasses.

BACKGROUND

Different types of disposable drinking cups exist, such as paper, plastic, and Styrofoam coffee cups or all purpose drinking cups. These types of drinking cups tend to be sold in relatively large quantities to a consumer or business that sells beverages in such types of cups. As examples, such drinking cups can be sold 50 (or more) cups per pack or 300 cups (or more) per case, or in other large quantities.

A major consideration in the sale of such quantities of cups is the cost to ship—because that affects the cost to sell such goods. The goal is to be as compact and efficient as possible in packaging large numbers of these drinking cups. This has been done by making the cups so that one cup fits inside another in a stack. Using this approach, such quantities can be shipped and stored in a reasonable volume to make it economical. This has been relatively easy with the truncated-cone shape widely used for such drinking cups, which naturally fit one inside the other.

SUMMARY OF INVENTION

In accordance with aspects of the inventive concepts, provided is a drinking cup, comprising a top portion having an open top and an open bottom, the open bottom defined by a bottom rim, and a bottom portion having an open top and a closed bottom, the open top defined by a top rim. The bottom rim and the top rim mate to form the drinking cup having a leak-proof closure.

In various embodiments, the closure can be a snap-type closure.

In various embodiments, the bottom rim of the top portion can include a laterally extending foot and the top rim of the bottom portion can include a well having a J-hook shaped curled edge configured to receive and retain the laterally extending foot to form the leak-proof seal.

In various embodiments, the closure can be a tongue and groove closure.

In various embodiments, the closure can be a threaded screw-type closure.

In various embodiments, the closure can be a press-fit closure.

In various embodiments, a top rim of the top portion ca have a smaller circumference then the bottom rim of the top portion.

In various embodiments, the drinking cup can have a wine glass shape when mated.

In various embodiments, the wine glass can be stem-less.

In various embodiments, a circumference of the drinking cup can be greatest between the open top of the top portion and the closed bottom of the bottom portion.

In various embodiments, the drinking cup can be disposable.

In accordance with another aspect of the inventive concept, provided is a wine cup having a two-piece bowl, comprising a top bowl portion having an open top and an open bottom, the open bottom defined by a bottom rim and a bottom bowl portion having an open top and a closed bottom, the open top defined by a top rim. A circumference of the bowl is greatest between the open top of the top portion and the closed bottom of the bottom portion and the bottom rim and the top rim mate to form a leak-proof closure at an intermediate location of the bowl.

In various embodiments, the closure can be a snap-type closure.

In various embodiments, the bottom rim of the top portion can include a laterally extending foot and the top rim of the bottom portion can include a well having a J-hook shaped curled edge configured to receive and retain the laterally extending foot to form the leak-proof seal.

In various embodiments, the closure can be a tongue and groove closure.

In various embodiments, the closure can be a threaded screw-type closure.

In various embodiments, the closure can be a press-fit closure.

In various embodiments, a top rim of the top portion can have a smaller circumference then the bottom rim of the top portion.

In various embodiments, the wine glass can be stem-less.

In accordance with another aspect of the inventive concept, provided is a plurality of stackable two-piece wine cups, comprising a plurality of nestable top bowl portions and a plurality of nestable bottom bowl portions. Each top bowl portion has an open top and an open bottom, the open bottom defined by a bottom rim. Each bottom bowl portion has an open top and a closed bottom, the open top defined by a top rim. A circumference of the bowl is greatest between the open top of the top portion and the closed bottom of the bottom portion and the bottom rim and the top rim mate to form a leak-proof closure at an intermediate location of the bowl.

In various embodiments, the closure can have a snap-type closure.

In various embodiments, the bottom rim of the top portion can include a laterally extending foot and the top rim of the bottom portion can include a well having a J-hook shaped curled edge configured to receive and retain the laterally extending foot to form the leak-proof seal.

In various embodiments, the closure can have a tongue and groove closure, a threaded screw-type closure, or a press-fit closure.

In various embodiments, the wine glass can be stem-less.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings:

FIG. 1G is a bottom view of the multi-part, nestable drinking cup of FIG. 1A;

FIG. 1H is a side view of a bottom portion of the multi-part, nestable drinking cup of FIG. 1A;

FIG. 1I is a partial scaled-up, cross-sectional view of a seam between the top and bottom portions of the multi-part, nestable drinking cup of FIG. 1A;

FIG. 2C is a top view of the multi-part, nestable drinking cup of FIG. 2A;

FIG. 2D is a side view of a top portion of the multi-part, nestable drinking cup of FIG. 2A;

FIG. 2G is a bottom view of the multi-part, nestable drinking cup of FIG. 2A;

FIG. 2H is a side view of a bottom portion of the multi-part, nestable drinking cup of FIG. 2A;

FIG. 2I is a partial scaled-up, cross-sectional view of a seam between the top and bottom portions of the multi-part, nestable drinking cup of FIG. 2A;

FIG. 3D is a perspective view of the multi-part, nestable drinking cup of FIG. 3A;

FIG. 3E is another side of the multi-part, nestable drinking cup of FIG. 3A with a scaled-up callout of a seam between the top and bottom portions;

DETAILED DESCRIPTION

Figure 1A:
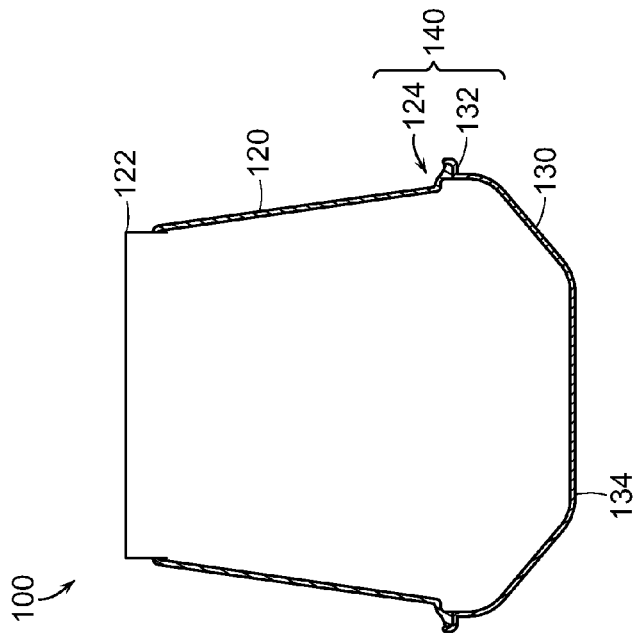
FIG. 1A is a side view of a first embodiment of a multi-part, nestable drinking cup, in accordance with aspects of the invention.
Figure 1B:
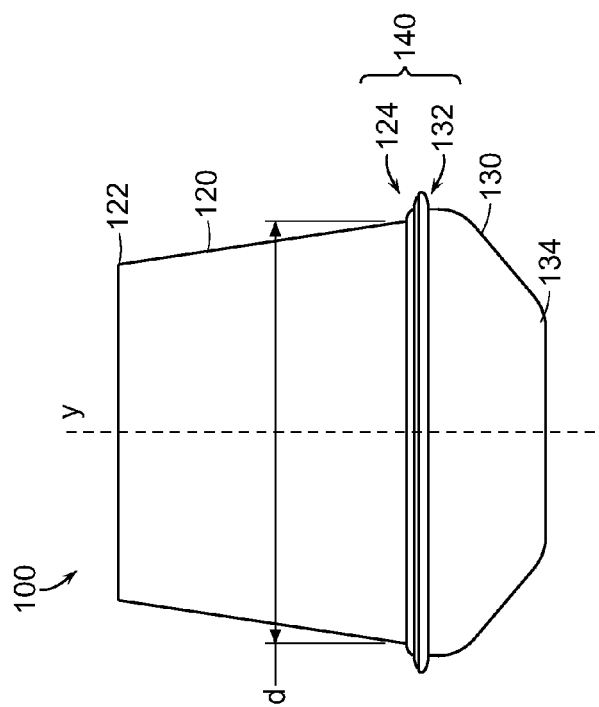
FIG. 1B is a cross-sectional view of the multi-part, nestable drinking cup of FIG. 1A.

Various exemplary embodiments will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

With respect to various drawings, dimensions may be shown, described, or implied, but only as examples. The present inventive concepts are not limited to such dimensions or ratios of dimensions, unless otherwise indicated.

In accordance with one aspect of the present disclosure, provided is a nestable and reconfigurable drinking cup having at least two portions that can be put into a nested arrangement when not in use and then combined to form a drinking cup for use.

In various embodiments, the drinking cup preferably takes the form of a wine cup (or "glass"), i.e., a drinking vessel made for drinking a beverage such as wine (e.g., red or white), port, sherry, brandy, or the like—and does not have the truncated-cone shape of typical disposable paper, plastic, or Styrofoam all-purpose or coffee cups. For example, the multiple parts can form the bowl of a wine cup, which has an intermediate diameter greater than top and bottom diameters of the bowl. As used herein, the word "glass" in the term "wine glass" does not necessitate that a drinking cup is made from a glass material. Rather, the term "wine glass" indicates the type of drinking cup, i.e., having the shape of a traditional wine glass, regardless of whether the drinking cup is made of paper, plastic, glass, metal, or some other material or materials.

Different wine glasses have different shapes, which are designed for specific types of wine (or similar beverages) and can enhance the experience of drinking the intended wine. Therefore, as a wine glass or cup, the drinking cup can take a specific wine glass shape, e.g., for red wine, white wine, flute, etc. Unlike truncated-cone cups, a width or diameter of a wine glass can be smaller at a drinking rim than it is at an intermediate portion. Therefore, a width of the wine glass at the drinking rim can be smaller than a width of the wine glass at an intermediate location, i.e., between the drinking rim and a bottom of the wine glass. Collectively, such a drinking cup can be referred to as a "wine glass" or "wine cup."

In various embodiments, the wine cup can have a bowl that is made of at least two portions, which can be referred to as a top portion and a bottom portion. The wine cup can be configured such that, in assembled form, the top and bottom portions mate together to form a wine cup bowl having a leak-proof seal and closure. When separated or unassembled, the top portion can be configured to nest inside the bottom portion, or vice versa, e.g., for economical storage, packaging, and shipping. Additionally, or alternative, a plurality of the tops can be made to nest together and a plurality of the bottoms can be made to nest together.

In various embodiments, the wine glass can be disposable, biodegradable, degradable, and/or compostable, or the like. And, in various embodiments, the wine glass can be reusable.

In various embodiments, the top portion can define an open drinking rim and the bottom portion can define a closed wine glass bottom. That is, the bottom portion can have a closed bottom end and a top rim opposite the closed bottom. Also, the top portion can include a bottom rim opposite the drinking rim of the top portion. The top rim of the bottom portion is configured to mate with the bottom rim of the top portion to form a closure. The closure is preferably a leak-proof closure that prevents liquid inside of the wine cup from leaking or seeping out of the closure. In various embodiments, the closure can be a tongue and groove closure, a threaded screw-type closure, a snap type closure, or press-fit closure.

In various embodiments, the wine glass may further include a stem. The stem may be a separate piece configured to mate with the wine glass bottom. In various embodiments, the present invention may be directed to a wine glass kit, comprising the top and bottom portions described herein and, optionally, the stem.

In various embodiments, the present invention may be directed to a method of making a nesting reconfigurable wine glass, including forming the top and bottom portions as described herein and, optionally, a stem.

FIGS. 1A-1I provide various views of a first embodiment of a multi-part, nestable drinking cup 100, in accordance with aspects of the first invention.

Drinking cup 100 includes a top portion 120 and a bottom portion 130. In cases where the drinking cup 100 is a wine cup or glass, as shown, the top and bottom portions mate to form a bowl portion of the wine cup.

The top portion 120 has an open top and an open bottom. The open top defines a drinking rim 122 and the bottom defines a bottom rim 124. The bottom portion 130 includes a closed bottom 134 and has an open top defined by a top rim 132. The bottom rim 124 of the top portion 120 and the top rim 132 of the bottom portion 130 mate to form the drinking cup 100 having a leak-proof closure 140.

In this embodiment, closure 140 is formed by a snap-fit between bottom rim 124 of top portion 120 and top rim 132 of bottom portion 130. Referring to FIG. 1I in particular, the bottom rim 124 of the top portion 120 includes a laterally projecting foot 146 extending from a leg 148 of top portion 120. And the top rim 132 of the bottom portion 130 defines a well 142 having a J-hook shape that is configured to receive the foot 146 of the top portion 120. The J-hook shape of the well 142 defines a curled edge 144 that curls over a top of foot 146 when mated together to form closure 140. The curled edge 144 retains foot 146 within well 142 to secure the top portion 120 to the bottom portion 130.

Foot 146 defines an engagement portion of bottom rim 124 of top portion 120 and has a slightly larger diameter than the curled edge 144, in this embodiment. Foot 146, curled edge 144, or both can be compressible so that the closure 140 is a snap-fit closure that is sufficiently tight to be leak-proof. That is, bottom rim 124 having foot 146 can be aligned with and pressed against top rim 132 having well 142 and curled edge 144 so that foot 146 is snapped passed curled edge 144 to be securely maintained within well 142.

In this embodiment, the closed bottom 134 of bottom portion 130 has a flat circular middle section and sides 136 that slant upward and away from a central axis y, see, e.g., FIG. 1A. The wine cup is generally circular from closed bottom 134 to drinking rim 122, in this embodiment.

An intermediate diameter d (or width) of the drinking cup 100 is greater than a diameter (or width) at the top, drinking rim 122. In this embodiment, as shown in FIGS. 1A, 1B 1E, and 1F, as examples, the intermediate diameter d (and width) of drinking cup 100 is also greater than the diameter (or width) of the closed bottom 134.

Figure 1C:
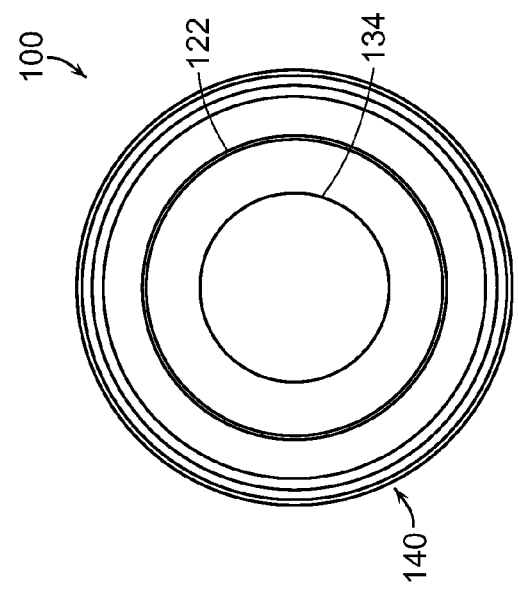
FIG. 1C is a top view of the multi-part, nestable drinking cup of FIG. 1A.
Figure 1D:
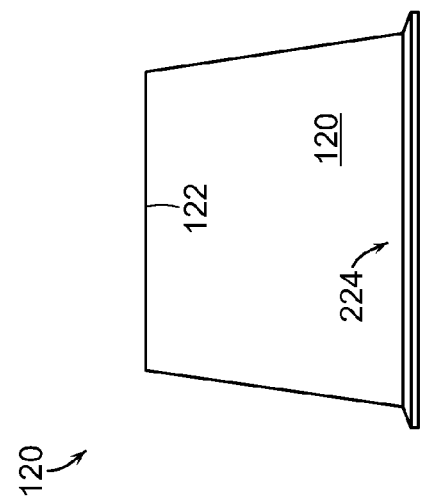
FIG. 1D is a side view of a top portion of the multi-part, nestable drinking cup of FIG. 1A.
Figure 1F:
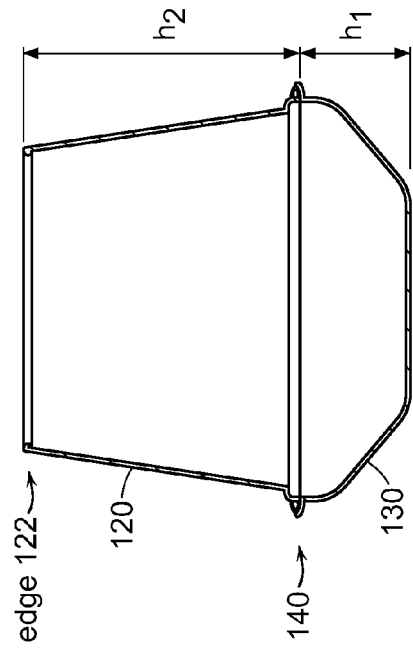
FIG. 1F is another cross-sectional view of the multi-part, nestable drinking cup of FIG. 1A.
Figure 1E:
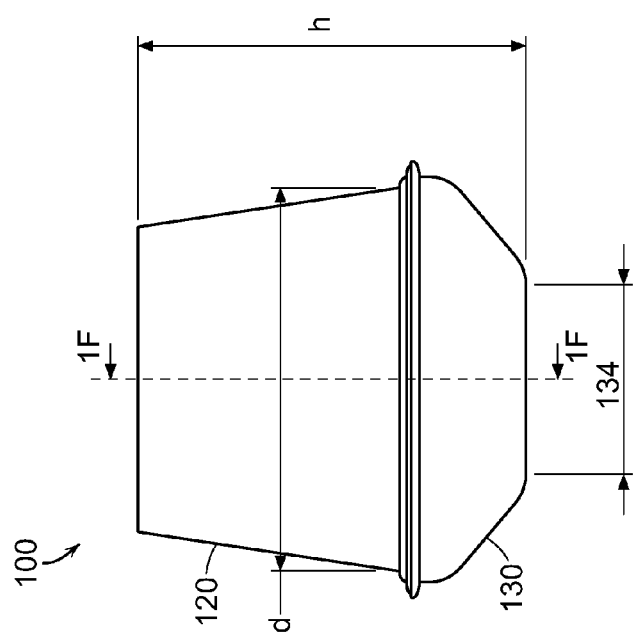
FIG. 1E is another side view of a first embodiment of a multi-part, nestable drinking cup of FIG. 1A.

Optionally, as shown in FIG. 1F, the drinking rim 122 can have a curled edge, i.e., that curls inward toward the internal volume of the drinking cup, or central y axis. The bottom portion can have a height h1 and the top portion can have a height h2, where h1+h2~h, the height of the bowl of the drinking cup 100.

FIG. 1C shows a top view, looking through the drinking rim 122 into the volume of the drinking cup 100, where the closed bottom 134 is visible. FIG. 1D shows a side view of only the top portion 120. FIG. 1G shows a bottom view of drinking cup 100, with the closed bottom 134 and the top rim 132 of the bottom portion 130 visible. FIG. 1H shows a side view of only the bottom portion 130.

Figure 2B:
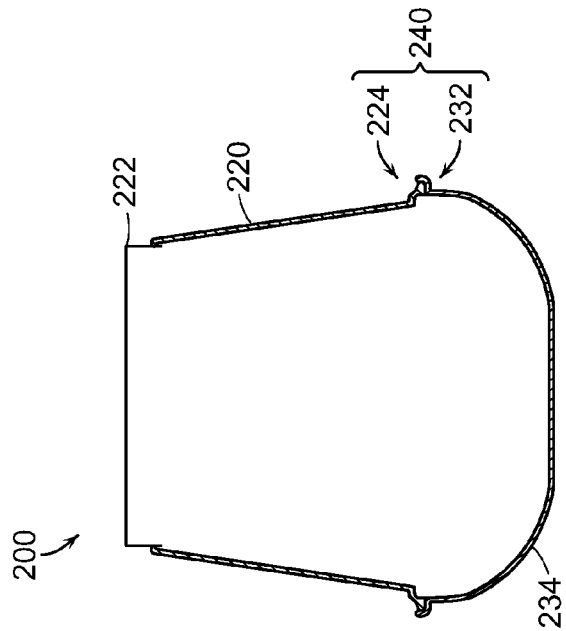
FIG. 2B is a cross-sectional view of the multi-part, nestable drinking cup of FIG. 2A.
Figure 2A:
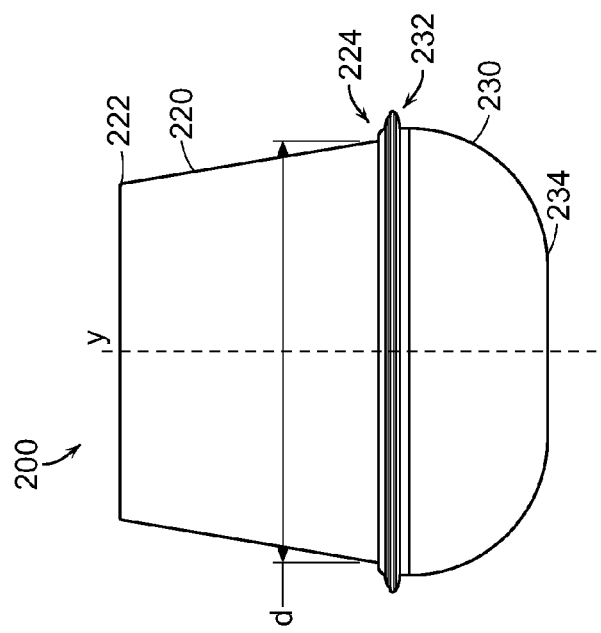
FIG. 2A is a side view of a second embodiment of a multi-part, nestable drinking cup, in accordance with aspects of the invention.

FIGS. 2A-1I provide various views of a second embodiment of a multi-part, nestable drinking cup 200, in accordance with aspects of the first invention.

This embodiment is substantially the same as drinking cup 100 for FIGS. 1A-1I, except for differences in the bottom portion 230 as compared to bottom portion 130. In fact, top portion 220 of drinking cup 200 is substantially the same as top portion 120 of drinking cup 100. That is, top portion 220 has an open top defining a drinking rim 222 and an open bottom defining a bottom rim 224, which is configured to mate with a top rim 232 of the bottom portion 230, thereby forming leak-proof closure 240.

Therefore, as with drinking cup 100, drinking cup 200 includes the top portion 220 and the bottom portion 230. In cases where the drinking cup 200 is a wine cup or glass, as in this embodiment, the top and bottom portions 220, 230 mate to form a bowl portion of the wine cup.

An intermediate diameter d (or width) of the drinking cup 200 is greater than a diameter (or width) at the drinking rim 222. In this embodiment, as shown in FIGS. 2A, 2B 2E, and 2F, as examples, the intermediate diameter d (and width) of the drinking cup 200 is also greater than the diameter (or width) of the closed bottom 234.

Figure 2F:
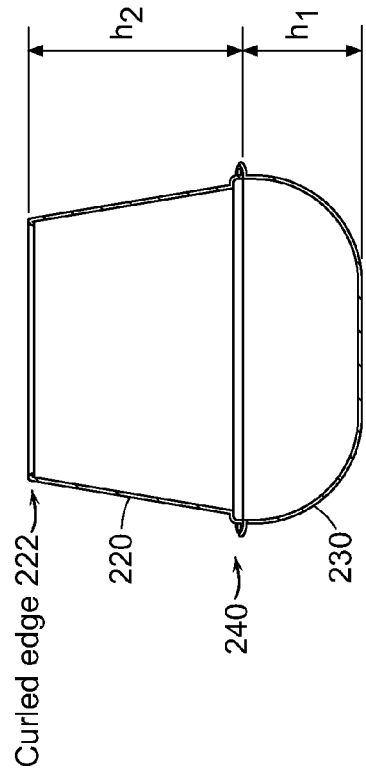
FIG. 2F is another cross-sectional view of the multi-part, nestable drinking cup of FIG. 2A.
Figure 2E:
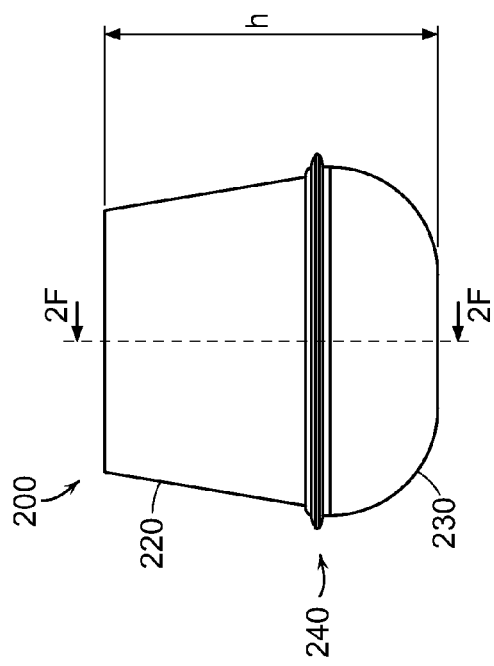
FIG. 2E is another side view of a first embodiment of a multi-part, nestable drinking cup of FIG. 2A.

Optionally, as shown in FIG. 2F, the drinking rim 222 can have a curled edge, i.e., that curls inward toward the internal volume of the drinking cup, or central y axis. The bottom portion can have a height h1 and the top portion can have a height h2, where h1+h2~h, the height of the bowl of the drinking cup 200.

FIG. 2C shows a top view, looking through the drinking rim 222 into the volume of the drinking cup 200, where closed bottom 234 is visible. FIG. 2D shows a side view of only the top portion 220. FIG. 2G shows a bottom view of drinking cup 200, with the closed bottom 234 and top rim 232 of the bottom portion 230 visible. FIG. 2H shows a side view of only the bottom portion 230.

In this embodiment, unlike the bottom portion 130 of drinking cup 100 in FIGS. 1A-1I, the bottom portion 230 includes the closed bottom 234 having a flat circular middle section and curved sides 236 that bow upward and away from a central axis y, see, e.g., FIG. 2A. The wine cup 200 is generally circular from closed bottom 234 to drinking rim 222, in this embodiment.

A leak proof closure 240 is formed when bottom rim 224 of the top portion 220 is mated with top rim 232 of the bottom portion 230. As shown in FIG. 2I, the closure 240 is substantially the same as closure 140 of FIG. 1I. For instance, closure 240 is formed by a snap-fit between bottom rim 224 of top portion 220 and top rim 232 of bottom portion 230. Referring to FIG. 2I in particular, the bottom rim 224 of the top portion 220 includes a laterally projecting foot 246 extending from a leg 248 of top portion 220. And the top rim 232 of the bottom portion 230 defines a well 242 having a J-hook shape that is configured to receive the foot 246 of the top portion 220. The J-hook shape of the well 242 defines a curled edge 244 that curls over a top of foot 246 when mated together to form closure 240. The curled edge 244 retains foot 246 within well 242 to secure the top portion 220 to the bottom portion 230.

Foot 246 defines an engagement portion of bottom rim 224 of top portion 220 and has a slightly larger diameter than the curled edge 244, in this embodiment. Foot 246, curled edge 244, or both can be compressible so that the closure 240 is a snap-fit closure that is sufficiently tight to be leak-proof. That is, bottom rim 224 having foot 246 can be aligned with and pressed against top rim 232 having well 242 and curled edge 244 so that foot 246 is snapped passed curled edge 244 to be securely maintained within well 242.

FIGS. 3A-3H provide various views of a third embodiment of a multi-part, nestable drinking cup 300, in accordance with aspects of the first invention.

Drinking cup 300 includes a top portion 320 and a bottom portion 330. In cases where the drinking cup 300 is a wine cup or glass, as in this embodiment, the top and bottom portions 320, 330 mate to form a bowl portion of the wine cup. The top portion 320 has an open top and an open bottom. The open top defines a drinking rim 322 and the bottom defines a bottom rim 324. The bottom portion 330 includes a closed bottom 334 and has an open top defined by a top rim 332. The bottom rim 324 of the top portion 320 and the top rim 332 of the bottom portion 330 mate to form the drinking cup having a leak-proof closure 340.

In this embodiment, an intermediate diameter d (or width) of the drinking cup 300 is greater than a diameter (or width) at a drinking rim 322.

In this embodiment, the closure 340 is formed by a tongue-and-groove snap-fit between bottom rim 324 of top portion 320 and top rim 332 of bottom portion 330. Referring to FIGS. 3E-3G in particular, the top rim 332 of the bottom portion 330 defines a laterally projecting tongue 342 of the bottom rim 324. And the top portion 320 includes a laterally recessed groove 346 formed at an inner surface of the bottom rim 324, and configured to receive the tongue 342 of the bottom portion 330. The shape of the groove 346 retains the tongue 342 when mated together to form closure 340.

Bottom rim 324 having tongue 342 can be aligned with and pressed against top rim 332 having groove 346 so that tongue 342 is snapped into groove 346 to form the leak-proof tongue-and-groove closure 340. Bottom rim 324, top rim 332, or both can be somewhat compressible to facilitate the fit to form closure 340.

Figure 3A:
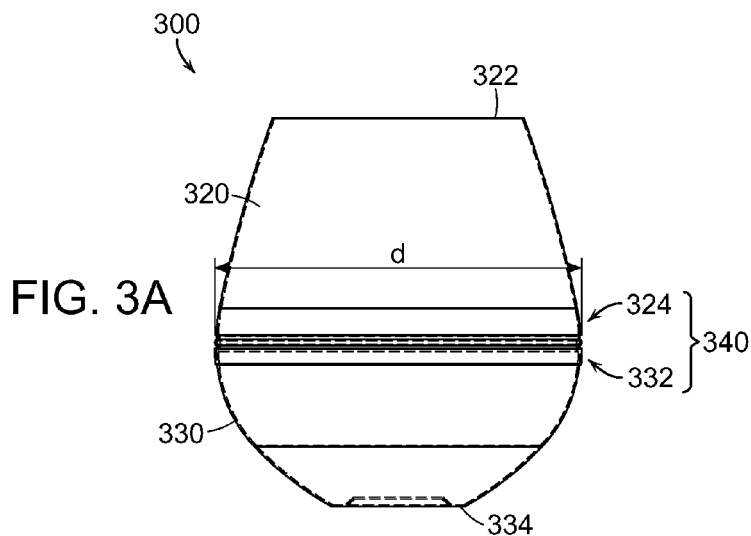
FIG. 3A is a side view of a third embodiment of a multi-part, nestable drinking cup, in accordance with aspects of the invention.
Figure 3B:
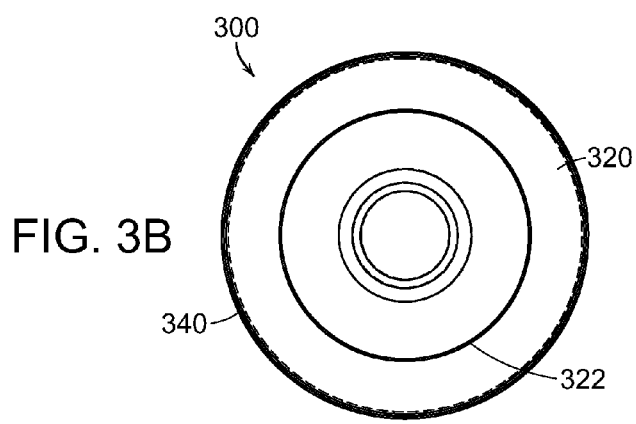
FIG. 3B is a top view of the multi-part, nestable drinking cup of FIG. 3A.
Figure 3C:
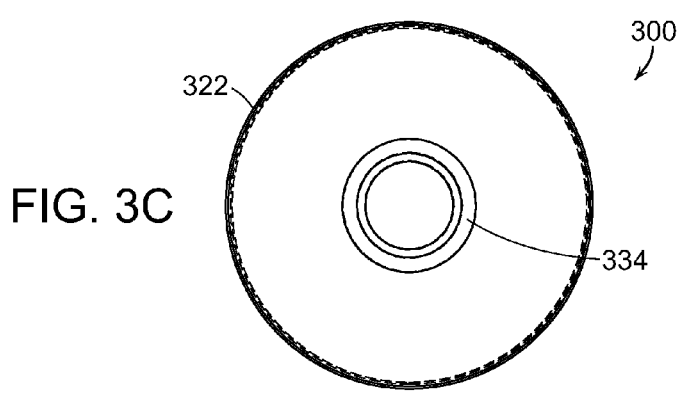
FIG. 3C is a bottom view of the multi-part, nestable drinking cup of FIG. 3A.
Figure 3F:
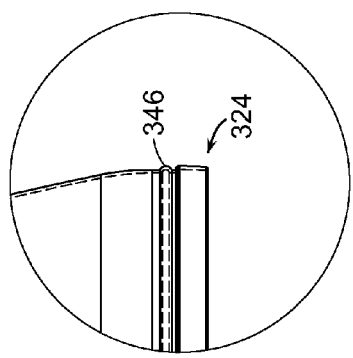
FIG. 3F is a side view of a top portion of the multi-part, nestable drinking cup of FIG. 3A.
Figures 1, 3F:
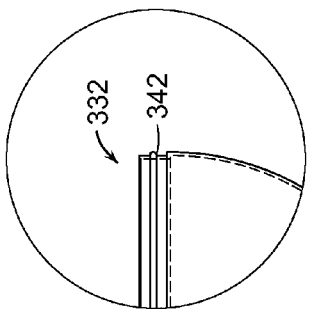
Figure 3G:
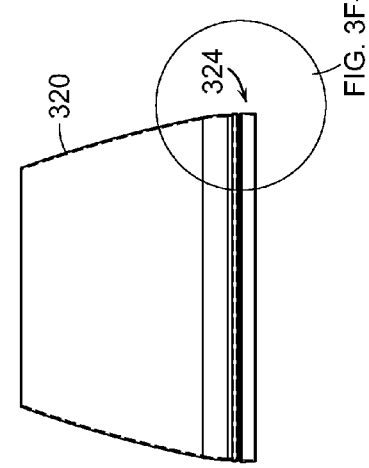
FIG. 3G is a side view of a bottom portion of the multi-part, nestable drinking cup of FIG. 3A.
Figures 1, 3G:
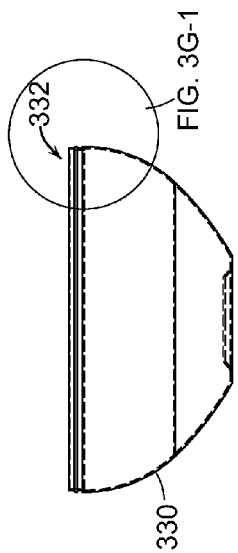
Figure 3H:
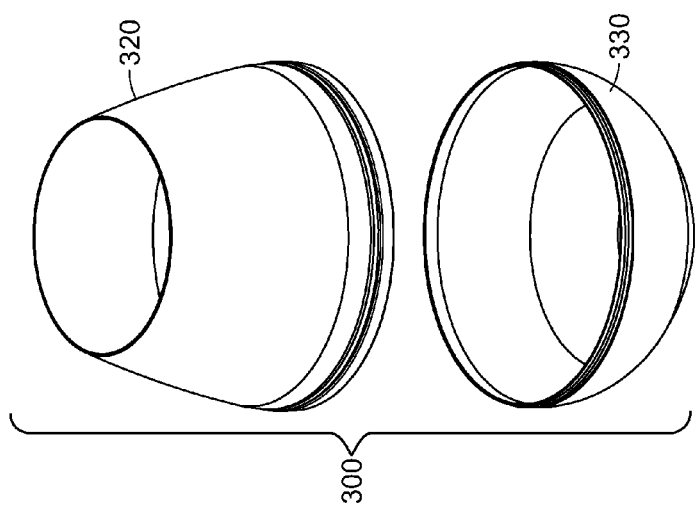
FIG. 3H is an unassembled perspective view of the multi-part, nestable drinking cup of FIG. 3A.

FIG. 3B shows a top view, looking through the drinking rim 322 into the volume of the drinking cup 300, where closed bottom 334 is visible. FIG. 3C shows a bottom view of drinking cup 300, with the closed bottom 334 and top rim 332 of the bottom portion 330 visible. FIG. 3D shows a perspective view of the drinking cup 300. FIG. 3H shows a perspective, side view of the drinking cup 300 in unassembled form, with the top portion 320 and the bottom portion 230 separated. FIGS. 3E-3G show callouts of the closure 340.

Figure 4A:
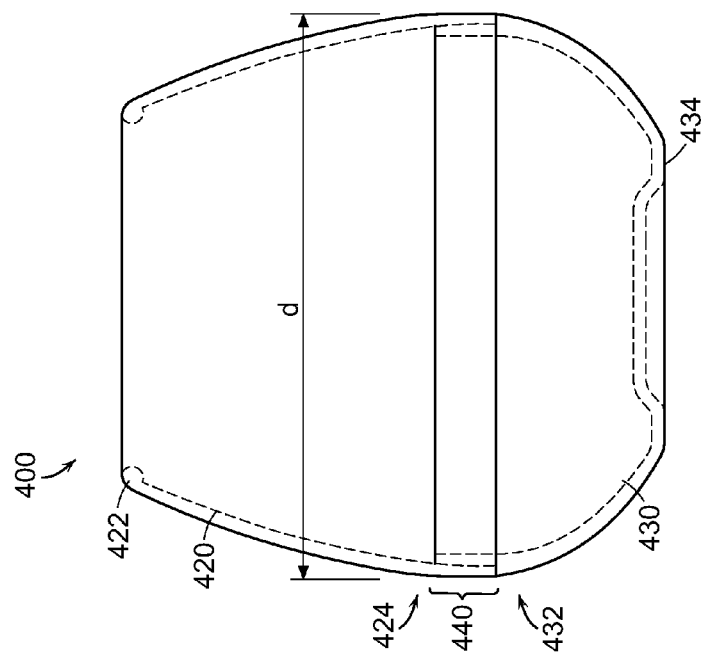
FIG. 4A is an assembled side view of a fourth embodiment of a multi-part, nestable drinking cup, in accordance with aspects of the invention.
Figure 4B:
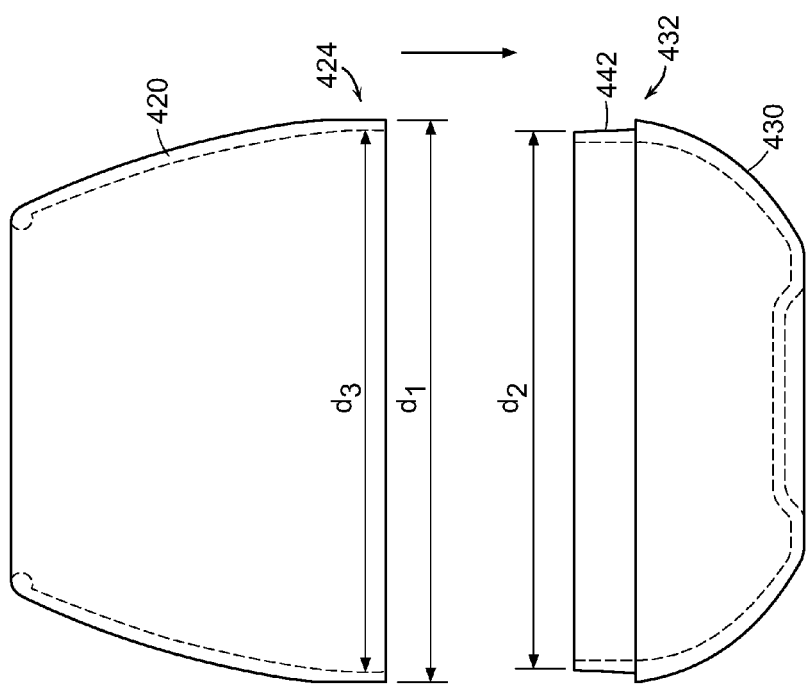
FIG. 4B is an unassembled perspective view of the multi-part, nestable drinking cup of FIG. 4A.

FIG. 4A-4B provide various side views of a fourth embodiment of a multi-part, nestable drinking cup 400, in accordance with aspects of the first invention. FIG. 4A is an assembled view and FIG. 4B is an unassembled view of drinking cup 400.

Drinking cup 400 includes a top portion 420 and the bottom portion 430. In cases where the drinking cup 400 is a wine cup or glass, as in this embodiment, the top and bottom portions 420, 430 mate to form a bowl portion of the wine cup. An intermediate diameter d (or width) of the drinking cup 400 is greater than a diameter (or width) at the drinking rim 422, in this embodiment.

The top portion 420 has an open top and an open bottom. The open top defines a drinking rim 422 and the open bottom defines a bottom rim 424. The bottom portion 430 includes a closed bottom 434 and has an open top defined by a top rim 432. The bottom rim 424 of the top portion 420 and the top rim 432 of the bottom portion 430 mate to form the drinking cup having a leak-proof closure 440.

In this embodiment, closure 440 is formed by a press fit between the bottom rim 424 of the top portion 420 and the top rim 432 of the bottom portion 430. In particular, the top rim 432 of the bottom portion 430 defines a wedge-shaped projection 442. And the top portion 420 includes a corresponding inner wall 446 formed at an inner surface of the bottom rim 424, and configured to receive the wedge-shaped projection 442 of the bottom portion 430.

An outer diameter d1 of bottom rim 424 comprising inner wall 446 is larger than an outer diameter d2 of the wedge-shaped projection 442 of the bottom portion 430. And an inner diameter d3 of the inner wall 446 starts at about equal to d2 to receive the wedge-shaped projection 442, but then tapers to become slightly smaller than d2 to retain the wedge-shaped projection 442 of the top rim 432 of the bottom portion 430 when mated together to form closure 440.

Bottom rim 424 can be aligned with and pressed against top rim 432 to form the leak-proof press fit closure 440. Bottom rim 424, top rim 432, or both can be somewhat compressible to facilitate the fit to form closure 440.

Optionally, as shown, the drinking rim 422 can have a curled edge, i.e., that curls inward toward the internal volume of the drinking cup, as could be true with other embodiments.

While the present invention has been describe in the context of a wine glass, it is conceivable that the present invention could be applied to other drinking cups that do not have the truncated-cone shape, where an intermediate diameter is greater than the drinking rim.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A drinking cup, comprising:
   a top portion having an open top and an open bottom, the open bottom defined by a bottom rim; and
   a bottom portion having an open top and a closed bottom, the open top of the bottom portion defined by a top rim, wherein the bottom rim of the top portion and the top rim of the bottom portion are configured to snap-fit together to form an assembled-drinking cup having a leak-proof closure, the leak-proof closure comprising:
      a foot; and
      a well configured to receive the foot, the well having a J-hook shaped curled edge that curls over a top of the foot when snapped together, such that the curled edge retains the foot within the well to secure the top portion to the bottom portion.

2. The cup of claim 1, wherein the bottom rim of the top portion includes the foot as a laterally extending foot and the top rim of the bottom portion includes the well having the J-hook shaped curled edge configured to receive and retain the laterally extending foot to form the leak-proof closure.

3. The cup of claim 1, wherein the closure is a tongue and groove closure.

4. The cup of claim 1, wherein a top rim of the top portion has a smaller circumference than the bottom rim of the top portion.

5. The cup of claim 1, wherein the drinking cup has a wine glass shape when mated.

6. The cup of claim 5, wherein the wine glass shape is stem-less.

7. The cup of claim 1, wherein a circumference of the drinking cup is greatest between the open top of the top portion and the closed bottom of the bottom portion.

8. The cup of claim 1, wherein the drinking cup is disposable.

9. A wine cup having a two-piece bowl, comprising:
   a top bowl portion having an open top and an open bottom, the open bottom defined by a bottom rim; and
   a bottom bowl portion having an open top and a closed bottom, the open top of the bottom bowl portion defined by a top rim that is configured to snap-fit together with the bottom rim of the top bowl portion to form an assembled two-piece bowl having a leak-proof closure comprising:
      a foot; and
      a well configured to receive the foot, the well having a J-hook shaped curled edge that curls over a top of the foot when snapped together, such that the curled edge retains the foot within the well to secure the top portion to the bottom portion,
   wherein a circumference of the two-piece bowl is greatest between the open top of the top portion and the closed bottom of the bottom portion.

10. The wine cup of claim 9, wherein the bottom rim of the top portion includes the foot as a laterally extending foot and the top rim of the bottom portion includes the well having the J-hook shaped curled edge configured to receive and retain the laterally extending foot to form the leak-proof seal.

11. The wine cup of claim 9, wherein the closure is a tongue and groove closure.

12. The wine cup of claim 9, wherein a top rim of the top portion has a smaller circumference than the bottom rim of the top portion.

13. The wine cup of claim 9, wherein the wine cup is stem-less.

14. A plurality of stackable two-piece wine cups, comprising:
   a plurality of nestable top bowl portions, each top bowl portion having an open top and an open bottom, the open bottom defined by a bottom rim; and
   a plurality of nestable bottom bowl portions, each bottom bowl portion having an open top and a closed bottom, the open top of the bottom bowl portion defined by a top rim that is configured to snap-fit together with the bottom rim of the top bowl portion to form an assembled two-piece bowl having a leak-proof closure comprising:
      a foot; and
      a well configured to receive the foot, the well having a J-hook shaped curled edge that curls over a top of the foot when snapped together, such that the curled edge retains the foot within the well to secure the top portion to the bottom portion,
   wherein a circumference of the two-piece bowl is greatest between the open top of the top portion and the closed bottom of the bottom portion.

15. The stackable two-piece wine cups of claim 14, wherein the bottom rim of the top portion includes the foot as a laterally extending foot and the top rim of the bottom portion includes the well having the J-hook shaped curled edge configured to receive and retain the laterally extending foot to form the leak-proof seal.

16. The stackable two-piece wine cups of claim 14, wherein the closure is a tongue and groove closure.

17. The stackable two-piece wine cups of claim 14, wherein the wine cups are stem-less.

* * * * *